United States Patent
Wigdahl et al.

(10) Patent No.: US 7,025,168 B2
(45) Date of Patent: Apr. 11, 2006

(54) STEERING CYLINDER SHIELD

(75) Inventors: Jeffrey Scott Wigdahl, Ames, IA (US); Bradley John Friest, Roland, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/825,975

(22) Filed: Apr. 16, 2004

(65) Prior Publication Data

US 2005/0230177 A1    Oct. 20, 2005

(51) Int. Cl.
*B62D 5/00*    (2006.01)

(52) U.S. Cl. .................. 180/436; 180/440; 180/84

(58) Field of Classification Search .............. 180/84, 180/417, 434, 436, 437, 440; 280/847

See application file for complete search history.

(56) References Cited

U.S. PATENT DOCUMENTS

| 2,539,018 | A | * | 1/1951 | Hardy ......................... 91/368 |
| 5,405,292 | A |   | 4/1995 | McConnell et al. ........ 460/119 |
| 5,850,727 | A |   | 12/1998 | Fox ............................... 56/1 |
| 6,202,781 | B1 | * | 3/2001 | Ima ............................. 180/252 |

FOREIGN PATENT DOCUMENTS

JP    2001233235 A  *  8/2001

* cited by examiner

*Primary Examiner*—Kevin Hurley

(57) ABSTRACT

A sliding shield structure is attached to the rod of a steering cylinder and moves with the rod to fully protect the rod at all times and to eliminate interference between the shield and steerable wheel throughout the steering range of the implement. Primarily support of the shield is by the implement axle structure, rollers and slides. The shield and the rod can rotate freely relative to each other to eliminate torque load transmission between the components. A notched plate holds the structure and facilitates easy removal by simply rotating the shield away from the cylinder rod.

17 Claims, 4 Drawing Sheets

STEERING CYLINDER SHIELD

FIELD OF THE INVENTION

The present invention relates generally to steering systems for off-road vehicles such as agricultural harvesters and, more specifically, to shielding for such steering systems.

BACKGROUND OF THE INVENTION

In the design of steering systems, using one double-acting cylinder connected to each wheel spindle is advantageous compared to more expensive and complicated two-cylinder systems. One problem with single cylinder systems is that the cylinder needs to be placed on the front side of the axle to optimize steering characteristics. For example, the Ackerman error can be reduced significantly by a front mounted arrangement. However, in such an arrangement the cylinder becomes exposed to crop passing beneath the machine. Cotton harvesting occurs when the plant stalk is still quite green, and therefore the cylinder rod must be protected from plant sap. If the rod is unprotected, sap builds up on the rod and causes premature seal failure. The geometry of the steering system is such that the space in which the cylinder rod extends is also the same space that is encroached by the tire and wheel when the cylinder is moved in the opposite direction. As a result, fixed shielding is rather ineffective. If the shield is made narrow enough to avoid the tires and wheels in sharp turns, cylinder rod protection from the crop is insufficient. Flexible accordion shields tend to collect dirt and debris, are easily damaged and have to operate effectively from a short closed length to a relatively long extended length. Removal of such shields for servicing and cleaning is difficult and time-consuming.

SUMMARY OF THE INVENTION

It is therefore an object of the present invention to provide an improved cylinder shield structure for an off-road implement such as a harvester. It is another object to provide such a shield which overcomes most or all of the aforementioned problems.

It is another object to provide an improved cylinder shield structure for a steering system of an off-road implement. It is a further object to provide such a system which is particularly useful for a single cylinder steering system and for a front-mounted cylinder steering system. It is another object to provide such a structure which is simple, reliable and easy to remove and attach. It is a further object to provide such a system which protects cylinder rod structure over substantially the entire range of steering angles.

A sliding shield structure is attached to the rod of a steering cylinder and moves with the rod. The rod is therefore fully protected at all times and does not interfere with tire and wheel at any point in the full steering range of the implement. Primarily support of the shield is by the implement axle structure using rollers and slides. The shield and the rod can rotate freely relative to each other to avoid introduction of unwanted torque loading between the shield and the rod. A notched plate and notched retainer hold the structure and facilitate easy removal by simply rotating a notched retainer away from rod. The shield structure is particularly useful with front-mounted, single cylinder steering systems wherein unwanted contact between the cylinder and vegetation or other obstacles passing under the implement frame could damage the systems.

These and other objects, features and advantages of the present invention will become apparent to one skilled in the art upon reading the following description in view of the drawings.

DESCRIPTION OF THE PREFERRED EMBODIMENT

Figure 1:
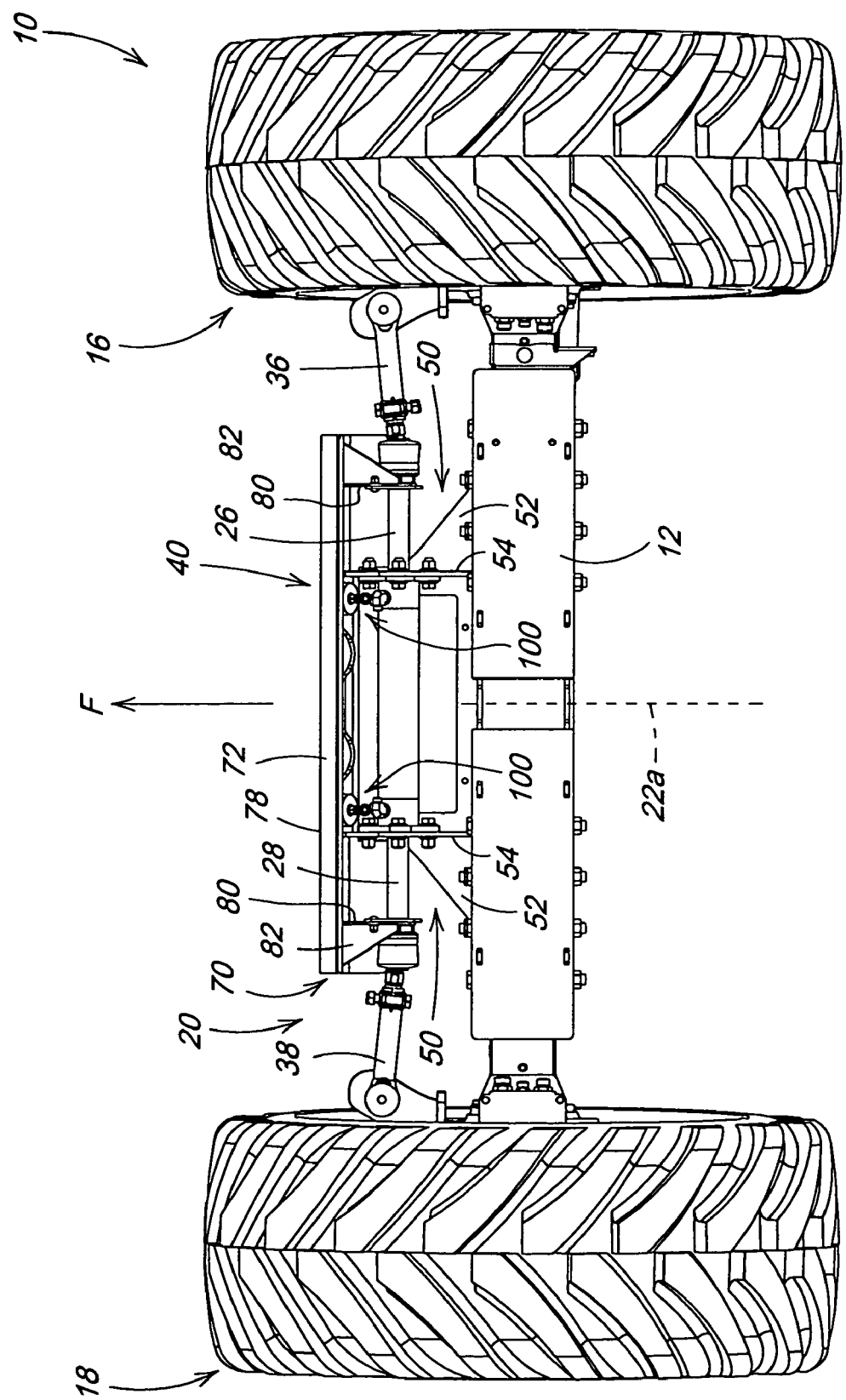
FIG. 1 is top view of a steerable axle assembly with a steering cylinder and protective shield.
Figure 2:
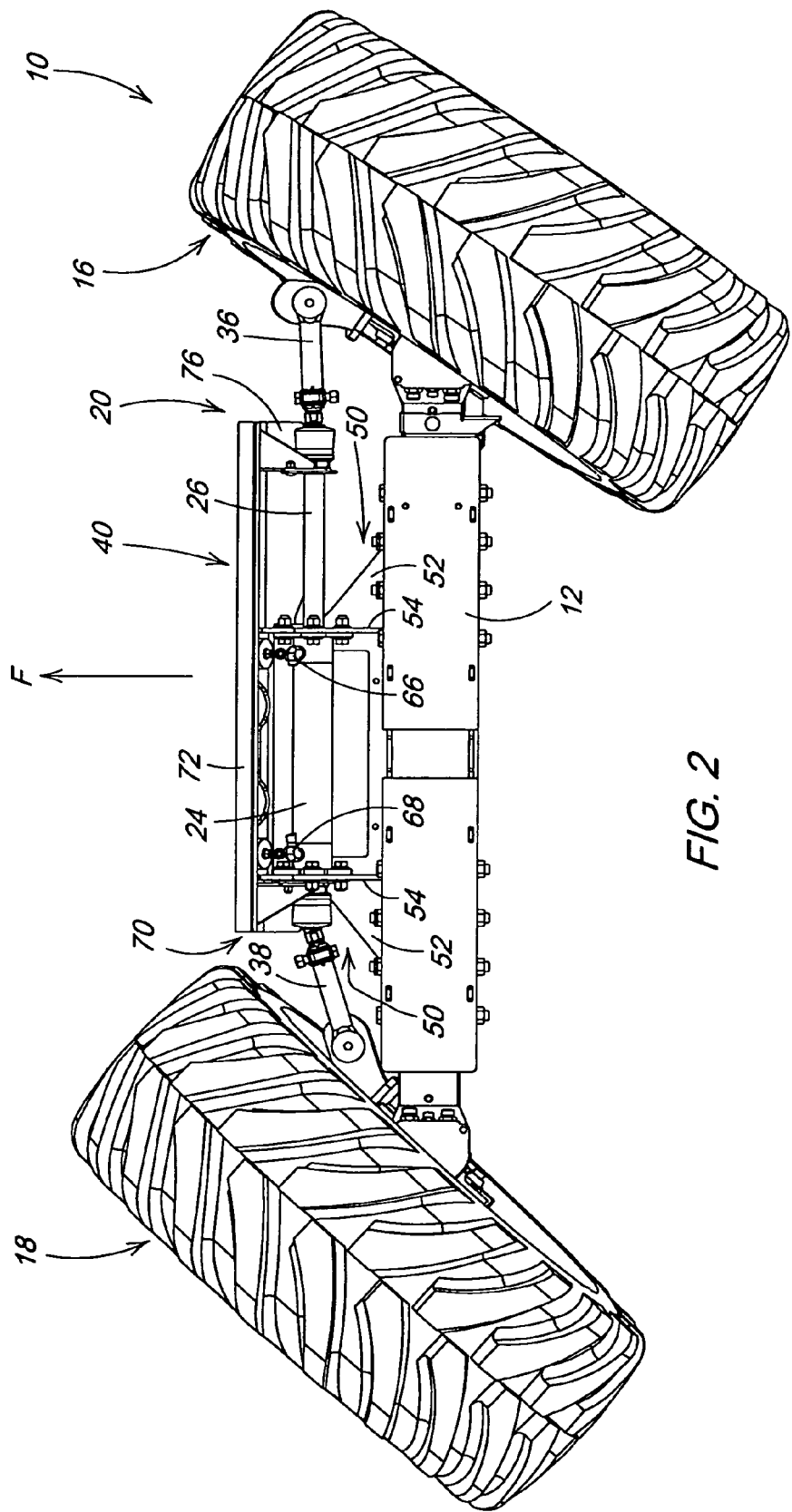
FIG. 2 is a view similar to that of FIG. 1 but showing the steerable axle assembly steered to a full right turn position.
Figure 3:
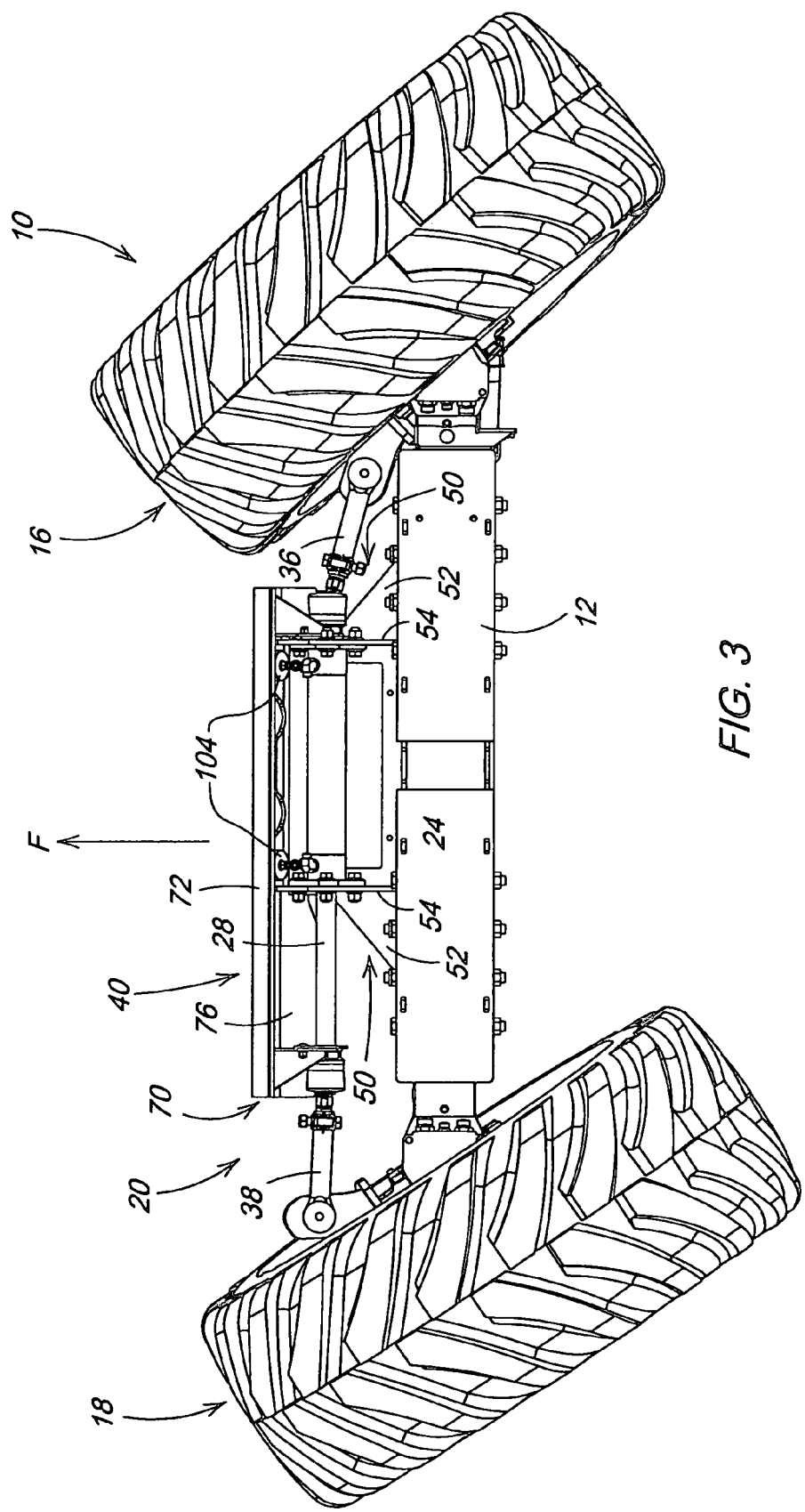
FIG. 3 is a view similar to FIG. 2 but showing the steerable axle assembly steered to a full left turn position.

Referring now to FIGS. 1–3, a steerable axle assembly 10 for an off-road vehicle or implement such as a cotton harvester includes an axle frame 12 connected to the implement frame (not shown) and right-hand and left-hand steerable wheel assemblies 16 and 18 pivotally connected to the ends of the axle frame 12. The axle frame 12 is offset above the ground and is adapted for forward movement F over plant material in the field. Steering structure indicated generally at 20 rotates the wheel assemblies about upright pivotal axes over a range of steerable positions from an extreme right-turn position (FIG. 2) through a straight-ahead position (FIG. 1) to an extreme left-turn position (FIG. 3). The entire axle assembly is pivotable about a generally fore-and-aft extending axis 22a (FIG. 1) to better follow the ground contour.

As shown in FIGS. 1–3, the steering structure 20 includes a front-mounted, single steering cylinder 24 with left and right cylinder rods 26 and 28 connected by conventional steering linkages 36 and 38 to the respective wheel assemblies 16 and 18. The steering structure 20 also includes a non-stationary shield assembly 40 supported forwardly of the cylinder 24 and protecting the cylinder and rods 26 and 28 from damage by plant or other material that the axle assembly may encounter in any of the positions over substantially the entire steering range without interfering with the wheel assemblies 16 and 18.

Cylinder and shield support structure 50 is bolted to the axle frame 12 and includes a pair of lower forwardly projecting horizontal plate structures 52 and upright plate structures 54. The plate structures 54 are apertured and spaced transversely to receive the ends of the barrel of the cylinder 24, and bolted brackets 56 secure the ends of the barrel forwardly of the frame 12 with the axis of the cylinder lying generally parallel to the frame 12. The cylinder 24 includes opposite ports 66 and 68 located adjacent the opposite ends of the barrel of the cylinder 24. The ports and the ends of the hydraulic lines connected to the ports are also protected by the shield assembly 40. Pressurizing the cylinder port 66 moves the rods 26 and 28 to the left to turn the wheel assemblies 16 and 18 towards the left (FIG. 3), while pressurizing the port 68 turns the wheel assemblies the opposite direction.

Figure 4:
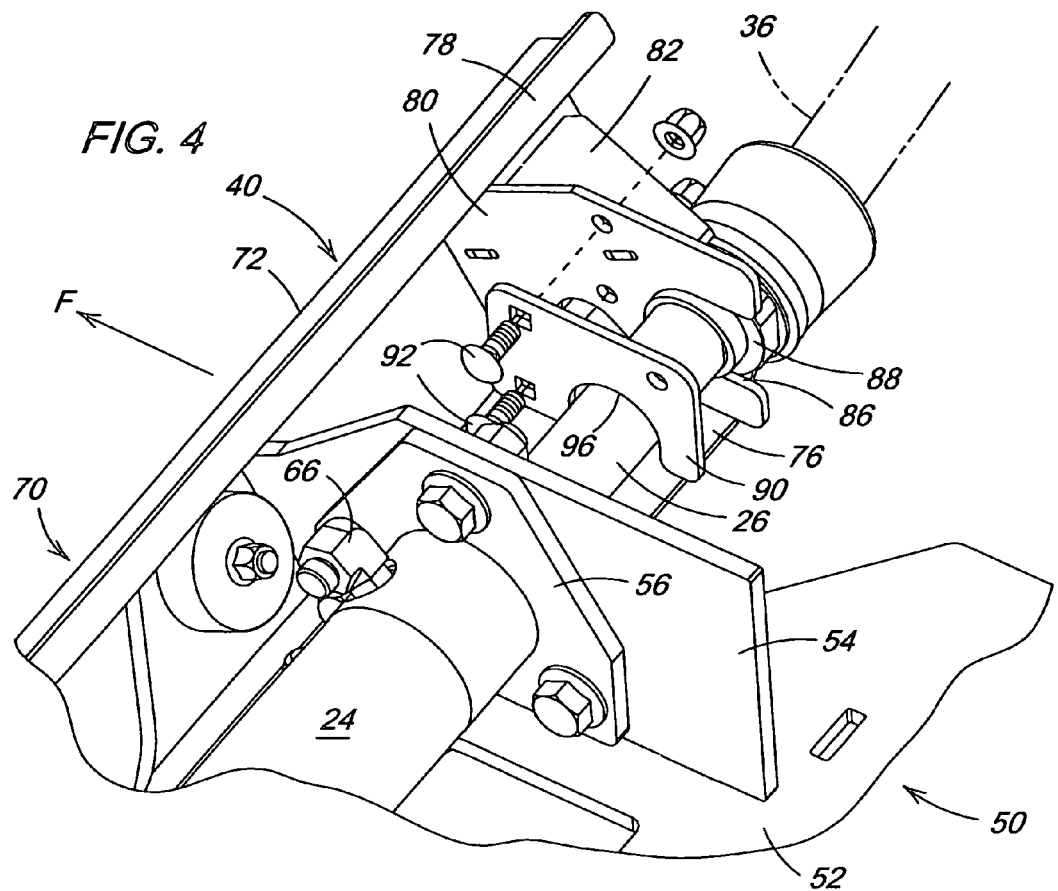
FIG. 4 is an enlarged perspective view of a portion of the shield and cylinder support.
Figure 5:
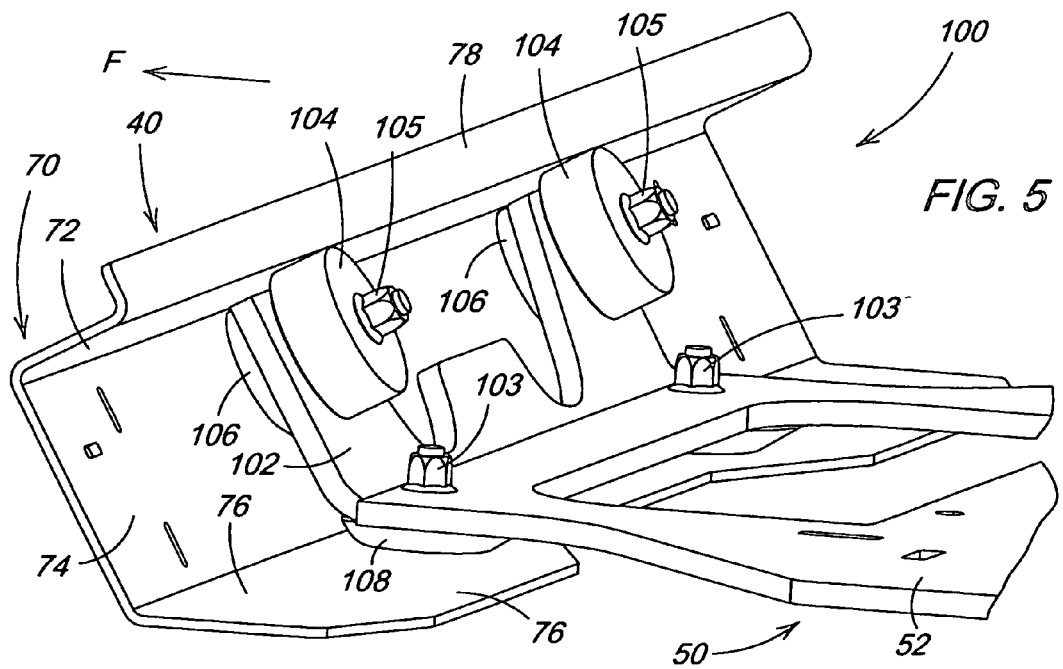
FIG. 5 is an enlarged perspective view showing details of the roller and slide support for the shield.

The shield assembly 40 includes a one-piece channel shaped shield member 70 opening rearwardly towards the cylinder 24 and including top, front and bottom walls 72, 74 and 76. An upwardly projecting flange 78 extends from the aft portion of the wall 72 to provide stiffening and added shielding. An upright support plate 80 and gusset 82 are secured to the opposite ends of the member 70 between the walls 72 and 76. The aft portion of the plates 80 include rearwardly opening notches or slots 86 (FIG. 4) just inwardly of corresponding enlarged portions 88 at locations adjacent the pivotal connection of the steering linkages 36 and 38 to the rods 26 and 28. Retainers 90 are connected to the plates 80 by bolts 92, and each includes a downwardly opening notch or slot 96 received over the rod end to retain the plate 80 on the rod end. The retainers 90 secure the opposite ends of the shield member 70 to the rods 26 and 28 and constrain the shield member 70 to move laterally with the rods while allowing relative rotation between the rods and the shield member 70 to eliminate unwanted torque transmissions between the rods and the shield assembly 40. The shield member 70 can be detached by simply removing the upper bolts 92 and rotating the retainers 90 upwardly about the lower bolt 92. If desired, the upper bolts 92 can be eliminated and the lower bolts lightly tightened to allow the retainers 90 to pivot by hand so that the shield assembly can be attached and removed without tools.

To maintain the shield member 70 in a protective position and facilitate transverse movement of the member relative to the frame 12 with steering of the wheel assemblies 16 and 18, a pair of roller support members 100 are secured to the plate structures 52 near the opposite ends of the barrel of the cylinder 24. Each roller support member 100 includes an angle bracket 102 connected by bolts 103 to the forward end of the corresponding plate 52. Rollers 104 are rotationally supported by bolts 105 on upstanding legs on the bracket 102 for contacting the underside of the wall 72 and supporting the shield member 70 for transverse movement relative to the support members 50 and frame 12. Upper forward slides 106 supported from the legs by the bolts 105 opposite the rollers 106 and downwardly facing slides 108 supported by the bolts 103 provide low friction, positional support for the shield member 70.

In operation, as the rods 26 and 28 are moved to steer the implement, the plates 80 and gussets 82 fixed to the shield member 70 move in unison with the rods to move the shield member. The upper wall is supported on the rollers 104 which rotate as the shield member 70 moves to the left or right with the rods 26 and 28. The rollers 104 and slides 106 and 108 provide good positional support and ease of shield movement, and the slotted connections at the plates 80 constrain the shield member for movement with the rods 26 and 28 without transferring torque between the members. The shield member 70 can be removed for maintenance and repair by simply removing the slotted retainers 90 and sliding the slotted plates 80 off the rods 26 and 28. As can best be seen in FIGS. 2 and 3, the shield member 70 provides effective shielding for the cylinder and cylinder rods over the entire range of steerable positions of the wheel assemblies 16 and 18. The movement of the shield member 70 with the steering of the implement assures that the shield member remains out of contact with the wheel assemblies at all steering positions in the range. The shield assembly 40 facilitates mounting of single cylinder steering systems on the front side of the axle to optimize steering characteristics.

Having described the preferred embodiment, it will become apparent that various modifications can be made without departing from the scope of the invention as defined in the accompanying claims. For example, although the shield assembly is shown with a single cylinder front mounted steering system, it is possible to utilize the movable shield arrangement with a variety of cylinder or actuator arrangements where movement of a shield with actuation is advantageous to provide effective protection.

The invention claimed is:

1. Steering cylinder structure movable in a forward direction over material, comprising:
   a frame;
   a cylinder having a movable first rod;
   cylinder support structure supporting the cylinder from the frame in a location wherein the cylinder will contact the material as the frame moves over the material;
   a retainer connected to the first rod and rotatable with respect to the rod; and
   a shield connected to retainer for movement with the rod so that the rod remains protected from the material as the first rod is moved, the retainer rotating with respect to the rod to limit torque transmission between the shield and the first rod.

2. The cylinder structure set forth in claim 1 including a shield support connected to the frame maintaining the shield in a rod-protecting position.

3. Steering cylinder structure movable in a forward direction over material, comprising:
   a frame;
   a cylinder having a movable first rod;
   cylinder support structure supporting the cylinder from the frame in a location wherein the cylinder will contact the material as the frame moves over the material;
   a shield connected to the first rod for movement with the rod so that the rod remains protected from the material as the first rod is moved; and
   including a roller support connected between the shield and the frame and supporting the shield from the frame for movement relative to the frame with the rod.

4. The cylinder structure as set forth in claim 1 wherein the cylinder comprises a steering cylinder connected to steerable wheels, and the shield moves with the rod to avoid contact with the steerable wheels during turning of the implement.

5. The cylinder structure as set forth in claim 4 wherein the steering cylinder is supported rearwardly of the shield.

6. The cylinder structure as set forth in claim 4 wherein the steering cylinder comprises a single cylinder and also includes a second rod opposite the first rod, and wherein the shield is connected between the first and second rods for movement with the first and second rods to protect the first and second rods over substantially all of a steering range of the steerable wheels while avoiding contact with the steerable wheels over the steering range.

7. The cylinder structure as set forth in claim 6 further including a shield support fixed to the frame, and wherein the shield is carried on the shield support.

8. Steering cylinder structure movable in a forward direction over material, comprising:
   a frame;
   a cylinder having a movable first rod;
   cylinder support structure supporting the cylinder from the frame in a location wherein the cylinder will contact the material as the frame moves over the material;
   a shield connected to retainer for movement with the rod so that the rod remains protected from the material as the first rod is moved;
   wherein the cylinder comprises a steering cylinder connected to steerable wheels, and the shield moves with the rod to avoid contact with the steerable wheels during turning of the implement;
   wherein the steering cylinder also includes a second rod opposite the first rod, and wherein the shield is connected between the first and second rods for movement with the first and second rods to protect the first and second rods over substantially all of a steering range of the steerable wheels while avoiding contact with the steerable wheels over the steering range;

further including a shield support fixed to the frame, and wherein the shield is carried on the shield support; and wherein the shield support includes rollers and the shield includes a portion supported on the rollers.

9. Steering cylinder structure movable in a forward direction over material, comprising:

a frame;

a cylinder having a movable first rod;

cylinder support structure supporting the cylinder from the frame in a location wherein the cylinder will contact the material as the frame moves over the material;

a shield connected to retainer for movement with the rod so that the rod remains protected from the material as the first rod is moved;

wherein the cylinder comprises a steering cylinder connected to steerable wheels, and the shield moves with the rod to avoid contact with the steerable wheels during turning of the implement:

wherein the steering cylinder also includes a second rod opposite the first rod, and wherein the shield is connected between the first and second rods for movement with the first and second rods to protect the first and second rods over substantially all of a steering range of the steerable wheels while avoiding contact with the steerable wheels over the steering range;

further including a shield support fixed to the frame, and wherein the shield is carried on the shield support; and wherein the shield is movable between a mounted position on the shield support and a release position for removal from the shield support, and structure selectively preventing movement of the shield from the mounted position during forward movement of the frame over the material.

10. The cylinder structure as set forth in claim 1 including means for movably supporting the shield from the frame to facilitate lateral movement of the shield while limiting torque transmission between the rod and the shield.

11. Steering structure movable in a forward direction over material, comprising:

a frame movable over the material:

a steering cylinder having a movable rod structure;

a cylinder support supporting the cylinder from the frame in a location wherein the cylinder will contact the material as the frame moves over the material;

a wheel assembly supported from the frame and connected to the steering cylinder, the wheel assembly movable over a range of steered positions by the steering cylinder;

a shield supported by the frame structure adjacent the steering cylinder;

wherein the shield is movable in response to movement of the wheel assembly by the steering cylinder to provide protection of the cylinder and rod structure substantially over the range of steered positions; and including means constraining the shield for lateral movement with the shield structure while facilitating relative rotation between the rod structure and the shield.

12. The steering structure as set forth in claim 11 wherein the steering cylinder is located forwardly of the implement frame structure and the shield is located forwardly of the steering cylinder.

13. Steering structure movable in a forward direction over material, comprising:

a frame movable over the material:

a steering cylinder having a movable rod structure;

a cylinder support supporting the cylinder from the frame in a location wherein the cylinder will contact the material as the implement moves over the material;

a wheel assembly supported from the frame and connected to the steering cylinder, the wheel assembly movable over a range of steered positions by the steering cylinder;

a shield supported by the frame structure adjacent the steering cylinder;

wherein the shield is movable in response to movement of the wheel assembly by the steering cylinder to provide protection of the cylinder and rod structure substantially over the range of steered positions; and including a shield support connected to the frame structure and including rollers supporting the shield.

14. The steering structure as set forth in claim 11 wherein the shield is connected to the rod structure.

15. Steering structure movable in a forward direction over material, comprising:

a frame movable over the material;

a steering cylinder having a movable rod structure;

a cylinder support supporting the cylinder from the frame in a location wherein the cylinder will contact the material as the frame moves over the material;

a wheel assembly supported from the frame and connected to the steering cylinder, the wheel assembly movable over a range of steered positions by the steering cylinder;

a shield supported by the frame structure adjacent the steering cylinder;

wherein the shield is movable in response to movement of the wheel assembly by the steering cylinder to provide protection of the cylinder and rod structure substantially over the range of steered positions;

wherein the shield is connected to the rod structure; and including a bracket rotatably received over the rod structure and connected to the shield to constrain the shield for lateral movement with the shield structure while facilitating relative rotation between the rod structure and the shield.

16. The steering structure as set forth in claim 11 wherein the rod structure includes first and second rods extending from opposite ends of a cylinder barrel, and wherein the shield is connected to outermost ends of the rod structure.

17. The steering structure as set forth in claim 16 further including low friction guide structure connected to the frame structure and maintaining the shield in a protective attitude as the shield moves with the rod structure.

* * * * *